US011414100B2

(12) United States Patent
Tsuji et al.

(10) Patent No.: US 11,414,100 B2
(45) Date of Patent: Aug. 16, 2022

(54) TRAVEL ASSISTANCE METHOD AND TRAVEL ASSISTANCE DEVICE

(71) Applicant: Nissan Motor Co., Ltd., Yokohama (JP)

(72) Inventors: Masafumi Tsuji, Kanagawa (JP); Hirotoshi Ueda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 97 days.

(21) Appl. No.: 16/635,908

(22) PCT Filed: Aug. 2, 2017

(86) PCT No.: PCT/JP2017/028093
§ 371 (c)(1),
(2) Date: Jan. 31, 2020

(87) PCT Pub. No.: WO2019/026210
PCT Pub. Date: Feb. 7, 2019

(65) Prior Publication Data
US 2020/0223449 A1    Jul. 16, 2020

(51) Int. Cl.
*B60W 60/00* (2020.01)
*G05D 1/02* (2020.01)

(52) U.S. Cl.
CPC ....... *B60W 60/0011* (2020.02); *G05D 1/0212* (2013.01); *G05D 2201/0213* (2013.01)

(58) Field of Classification Search
CPC ............. B60W 60/0011; G05D 1/0212; G05D 2201/0213

USPC .......................................................... 701/26
See application file for complete search history.

(56) References Cited

U.S. PATENT DOCUMENTS

| 9,672,734 | B1* | 6/2017 | Ratnasingam ....... G08G 1/0968 |
| 2012/0095671 | A1 | 4/2012 | Matsumura et al. |
| 2015/0307095 | A1* | 10/2015 | Aso ....................... B60W 30/12 701/1 |
| 2016/0272243 | A1* | 9/2016 | Matsuno .............. G05D 1/0219 |
| 2017/0123434 | A1 | 5/2017 | Urano et al. |
| 2017/0197634 | A1* | 7/2017 | Sato ..................... B60W 50/082 |
| 2017/0315551 | A1* | 11/2017 | Mimura ............... B62D 15/025 |
| 2019/0071098 | A1* | 3/2019 | Asakura ............. G06K 9/00798 |
| 2019/0369616 | A1* | 12/2019 | Ostafew .......... B60W 60/00274 |

FOREIGN PATENT DOCUMENTS

| JP | H09-178849 A | 7/1997 |
| JP | 2004-220348 A | 8/2004 |
| JP | 2006-126980 A | 5/2006 |

(Continued)

*Primary Examiner* — Yazan A Soofi
(74) *Attorney, Agent, or Firm* — Young Basile Hanlon & MacFarlane, P.C.

(57) ABSTRACT

A travel assistance method generates a first traveling path based on map information around a circumference of a host vehicle, generates a second traveling path based on the surroundings, determines that a switch from the first traveling path to the second traveling path is needed when detecting that the first traveling path being generated is to end ahead of the host vehicle while the host vehicle is traveling on the first traveling path, and controls the host vehicle to make a transition from the first traveling path to the second traveling path when the switch is determined to be needed.

21 Claims, 6 Drawing Sheets

(56) References Cited

FOREIGN PATENT DOCUMENTS

| | | |
|---|---|---|
| JP | 2014-184747 A | 10/2014 |
| JP | 2015-058752 A | 3/2015 |
| JP | 2015-175824 A | 10/2015 |
| JP | 2015-210720 A | 11/2015 |
| JP | 2016-050901 A | 4/2016 |
| JP | 2016-200472 A | 12/2016 |
| JP | 2017-087816 A | 5/2017 |
| WO | 2010/100743 A1 | 9/2010 |

* cited by examiner

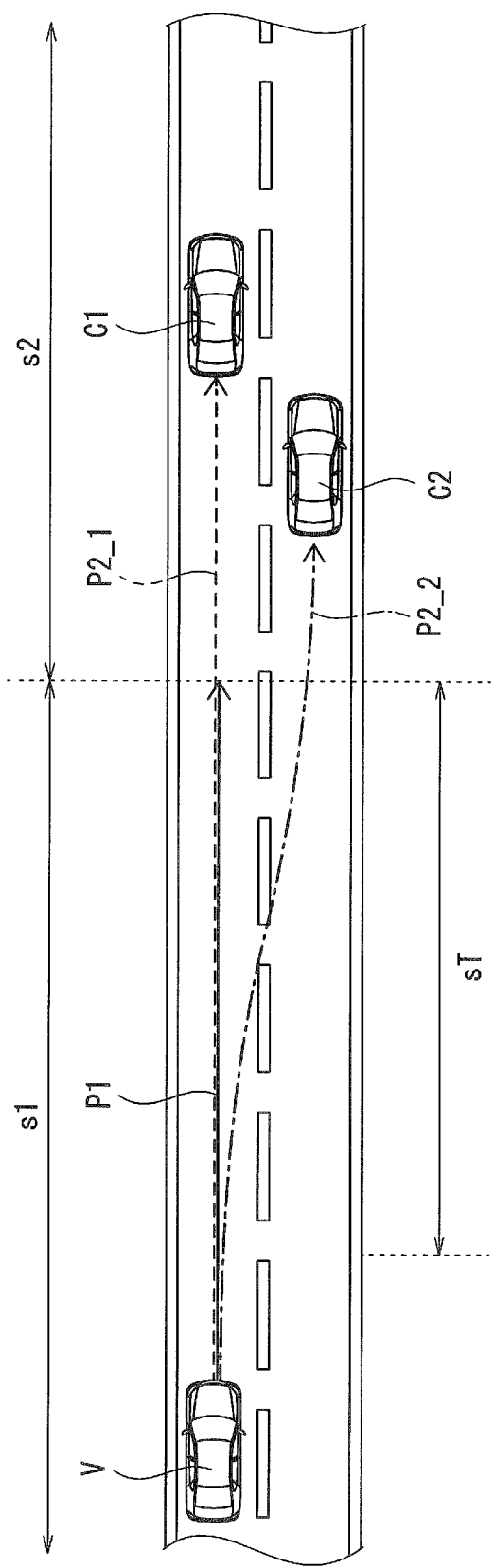

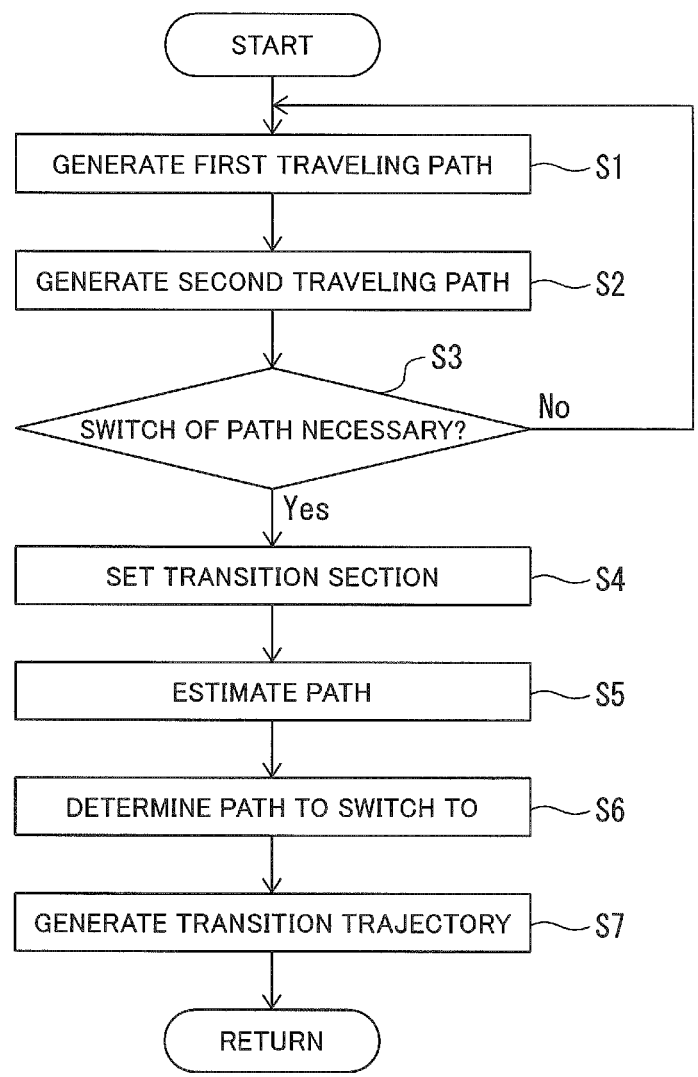

TRAVEL ASSISTANCE METHOD AND TRAVEL ASSISTANCE DEVICE

TECHNICAL FIELD

The present invention relates to a travel assistance method and a travel assistance device.

BACKGROUND

Japanese Patent Unexamined Publication No. 2016-050901 discloses a technique for making a changeover from automated drive control based on map information to manual drive based on a drive operation by a user of a vehicle when there is a branch point which meets a predetermined condition ahead of the vehicle, and recovers the automated drive control after the vehicle traveling by the manual drive has passed through the branch point.

SUMMARY

When the vehicle traveling on a traveling path based on the map information enters an area not covered by the map information and switches to another traveling path based on a trajectory of a preceding vehicle, for example, the vehicle may cause irregular behavior depending on the condition of the traveling path to follow.

To solve the above conventional problem, the present invention provides a travel assistance method and a travel assistance device enabling a vehicle to prevent irregular behavior when switching from a traveling path based on map information to another traveling path.

An aspect of the present invention provides a travel assistance method including generating a first traveling path based on map information around a circumference of a host vehicle, generating a second traveling path based on surroundings of the host vehicle, determining that a switch from the first traveling path to the second traveling path is needed when detecting that the first traveling path being generated is to end ahead of the host vehicle while the host vehicle is traveling on the first traveling path, and controlling the host vehicle to make a transition from the first traveling path to the second traveling path when the switch is determined to be needed.

BRIEF DESCRIPTION OF THE DRAWINGS

FIG. 5 is a diagram illustrating a case of generating a plurality of traveling paths which are traveling trajectories of the respective preceding vehicles; and FIG. 6 is a flowchart illustrating a travel assistance method according to the embodiment of the present invention.

DETAILED DESCRIPTION

Figure 1:
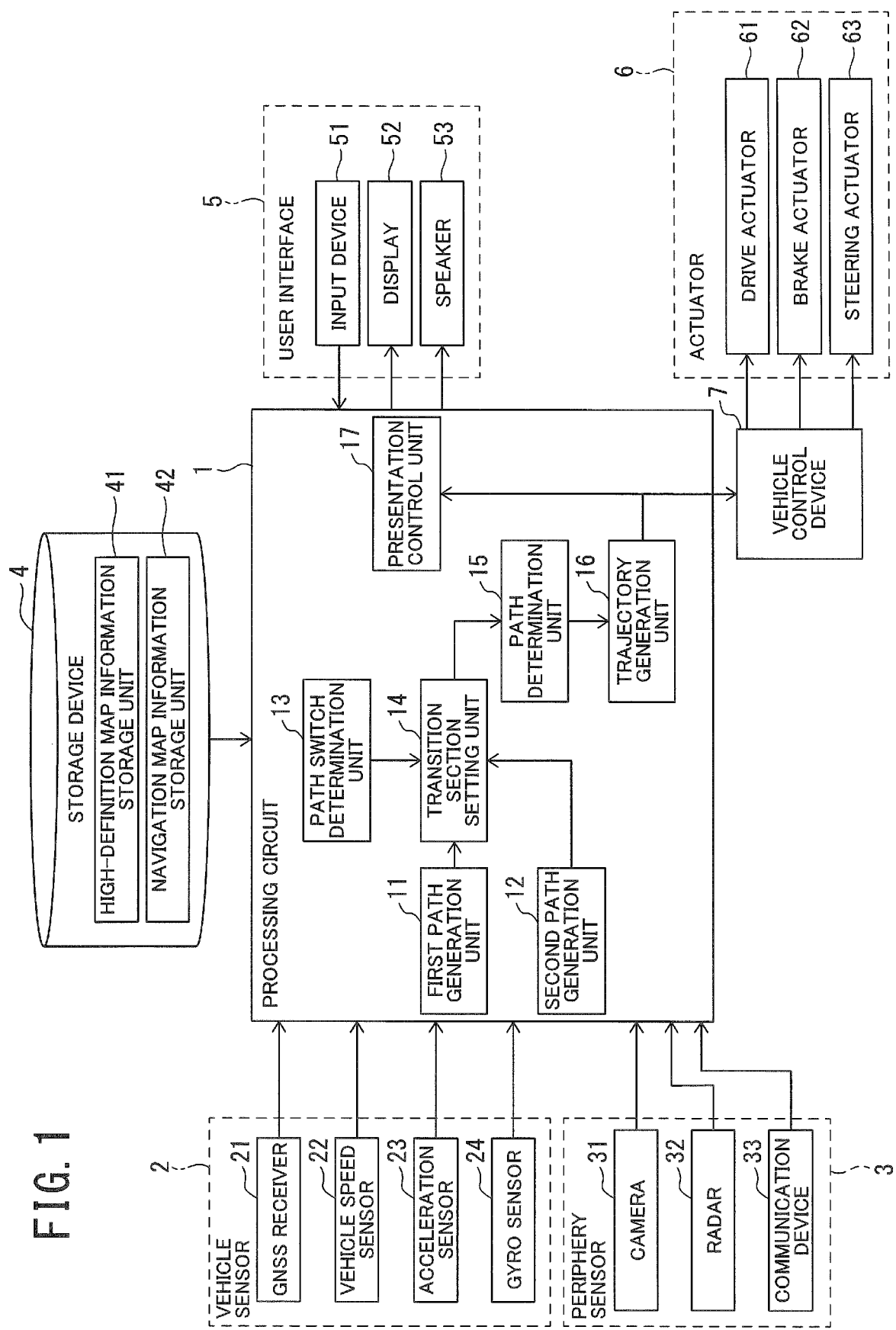
FIG. 1 is a block diagram illustrating a travel assistance device according to an embodiment of the present invention.

Hereinafter, an embodiment according to the present invention will be described with reference to the drawings. In the descriptions of the drawings below, the same or similar elements are indicated by the same or similar reference numerals, and overlapping explanations are not repeated below. It should be understood that the drawings are illustrated schematically, and are not drawn to scale. The embodiment described below illustrates a device and a method for embodying the technical ideas of the present invention which are not intended to be limited to the structures or arrangements of the elements as described herein. The technical ideas of the present invention are to cover various modifications falling within the scope of the invention as defined by the appended claims.

(Travel Assistance Device)

A travel assistance device according to the embodiment of the present invention is mounted on a vehicle, for example (hereinafter, a vehicle on which the travel assistance device according to the embodiment is mounted is referred to as a "host vehicle"). The travel assistance device according to the embodiment can execute travel assistance processing, including autonomous driving which controls the host vehicle to autonomously travel along a traveling path, and a guide to urge a driver to cause the host vehicle to travel along the traveling path. The autonomous driving includes both cases of executing all of driving, braking, and steering operations of the host vehicle without the occupant (driver) involved in any operation, and executing at least one of the driving, braking, and steering operations. The autonomous driving may execute any of preceding vehicle following control, distance-to-vehicle control, and lane deviation prevention control, for example. The manual driving refers to a state of driving by the operation of the driver without the travel assistance device according to the embodiment of the present invention performing any of the driving, braking, and steering operations on the host vehicle.

As illustrated in FIG. 1, the travel assistance device according to the embodiment includes a processing circuit (traveling path switch device) 1, a vehicle sensor 2, a periphery sensor 3, a storage device 4, a user interface (I/F) 5, an actuator 6, and a vehicle control device 7. The processing circuit 1, the vehicle sensor 2, the periphery sensor 3, the storage device 4, the user I/F 5, the actuator 6, and the vehicle control device (vehicle control circuit) 7 can communicate with each other so as to transfer and receive data and signals through a controller area network (CAN) bus, for example, in a wired or wireless manner.

The vehicle sensor 2 is a sensor which detects positional information and a traveling state of the host vehicle. The vehicle sensor 2 includes a global navigation satellite system (GNSS) receiver 21, a vehicle speed sensor 22, an acceleration sensor 23, and a gyro sensor 24. The types and number of the vehicle sensor 2 are not limited to the above case. The GNSS receiver 21 is a global positioning system (GPS) receiver, for example, which acquires the positional information of the host vehicle based on a radio-wave signal received from a plurality of navigation satellites, and outputs the acquired positional information of the host vehicle to the processing circuit 1. The vehicle speed sensor 22 detects a vehicle speed based on a wheel speed of the host vehicle, for example, and outputs the detected vehicle speed to the processing circuit 1. The acceleration sensor 23 detects acceleration in the front-rear direction and the vehicle width direction of the host vehicle, for example, and outputs the detected acceleration to the processing circuit 1. The gyro sensor 24 detects an angular velocity such as a yaw axis rotation of the host vehicle, and outputs the detected angular velocity to the processing circuit 1.

The periphery sensor 3 is a sensor which detects the surroundings (surrounding conditions) including the front side of the host vehicle. The periphery sensor 3 includes a camera 31, a radar 32, and a communication device 33. The types and number of the periphery sensor 3 are not limited to the above case. The camera 31 can be a CCD camera, for example. The camera 31 may be any of a monocular camera, a stereo camera, and an omnidirectional camera. The camera 31 captures the surroundings of the host vehicle, detects, as data of the surroundings of the host vehicle from a captured image, a relative position of an object such as vehicles (other vehicles) such as a preceding vehicle, a pedestrian or a bicycle with respect to the host vehicle, a distance between the object and the host vehicle, a road figure, and a road structure such as lane boundaries (white lines) on a road, and outputs the detected data of the surroundings to the processing circuit 1.

The radar 32 can be a millimeter-wave radar, an ultrasonic-wave radar, or a laser rangefinder (LRF), for example. The radar 32 detects, as data of the surroundings of the host vehicle, a relative position of an object with respect to the host vehicle, a distance between the object and the host vehicle, and a relative speed of the object with respect to the host vehicle, and outputs the detected data of the surroundings to the processing circuit 1. The communication device 33 receives data of the surroundings of the host vehicle such as positions of other vehicles and speeds of other vehicles through vehicle-to-vehicle communications with other vehicles, road-to-vehicle communications with a road side unit, or communications with a traffic information center, for example, and outputs the detected data of the surroundings to the processing circuit 1.

The storage device 4 can be a semiconductor memory, a magnetic memory, or an optical memory, for example, and may be included in the processing circuit 1. The storage device 4 may be implemented by a single piece of hardware, or may be implemented by plural pieces of hardware. The storage device 4 includes a high-definition map information storage unit 41 for storing high-definition map information (map information), and a navigation map information storage unit 42 for storing map information for navigation (hereinafter referred to as "navigation map information"). A database of the navigation map information and the high-definition map information may be controlled by a server, so that the storage device 4 can acquire only difference data of the navigation map information and the high-definition map information after being updated through telematics so as to update the navigation map information stored in the navigation map information storage unit 42 and the high-definition map information stored in the high-definition map information storage unit 41.

The navigation map information stored in the navigation map information storage unit 42 includes pieces of information per road. Examples of information per road included in the navigation map information include road nodes indicating reference points on a road reference line (such as a center line of a road), and road links indicating sectional aspects of a road between the respective road nodes. The information on the road nodes includes a corresponding identification number, positional coordinates, the number of road links to be connected with, and an identification number of the respective road links to be connected with. The information on the road links includes a corresponding identification number, a road attribute, a link length, the number of lanes, a road width, and a speed limit.

The high-definition map information stored in the high-definition map information storage unit 41 is map information having higher definition than the navigation map information, and includes pieces of information per lane more specific than the information per road. When there are plurality of lanes in one direction on a road, the high-definition map information includes information per lane. Examples of information per lane included in the high-definition map information include lane nodes indicating reference points on a lane reference line (such as a middle line in a lane), and lane links indicating sectional aspects of a lane between the respective lane nodes. The information on the lane nodes includes a corresponding identification number, positional coordinates, the number of lane links to be connected with, and an identification number of the respective lane links to be connected with. The information on the lane links includes a corresponding identification number, a type of lane, a lane width, a type of lane boundary, a lane figure, and a figure of a lane reference line. The high-definition map information further includes information on objects on the ground, such as the type and positional coordinates of objects on the ground including a traffic signal, a stop line, a sign, a building, a telegraph pole, a curb, and a crosswalk present on or around a lane, and the identification number of each lane node and the identification number of each lane link corresponding to the positional coordinates of the objects on the ground.

Since the high-definition map includes the information on the nodes and links per lane, the lane in which the host vehicle is currently traveling on the traveling route can be specified. The high-definition map includes positional information in a lane, which is information on coordinates indicative of a position of the lane in the extending direction and the width direction. The high-definition map also has coordinates of objects indicative of each position in a three-dimensional space (such as a longitude, a latitude, and an altitude), and each lane and the above objects on the ground can be indicated by the corresponding figures in a three-dimensional space.

The processing circuit 1 and the vehicle control device 7 each serve as a controller such as an electronic control unit (ECU) for performing arithmetic logic operations necessary for the processing of the travel assistance device according to the embodiment of the present invention, and may include a processor, a storage device, and an input-output I/F. The processor may be a microprocessor equivalent to a central processing unit (CPU), for example, including an arithmetic logic unit (ALU), a control circuit (control device), and various types of registers. The internal or external storage device included in each of the processing circuit 1 and the vehicle control device 7 may be a semiconductor memory or a disk medium, for example, and may include a register, a cache memory, and a storage medium such as a ROM or a RAM as a main storage device. For example, the processor can execute a program (a travel assistance program) preliminarily stored in the storage device and including a series of processing necessary for the operations of the travel assistance device according to the embodiment of the present invention.

The processing circuit 1 includes logic blocks as functional or physical hardware resources, such as a first path generation unit 11, a second path generation unit 12, a path switch determination unit 13, a transition section setting unit 14, a path determination unit 15, a trajectory generation unit 16, and a presentation control unit 17. These logic blocks may physically implement a programmable logic device (PLD) such as a field-programmable gate array (FPGA), or may implement a functional logic circuit equivalently set in a general-purpose semiconductor integrated circuit by processing of software.

The first path generation unit 11, the second path generation unit 12, the path switch determination unit 13, the transition section setting unit 14, the path determination unit 15, the trajectory generation unit 16, and the presentation control unit 17 included in the processing circuit 1 may be implemented by a single piece of hardware, or may each be implemented by individual hardware. The vehicle control device 7 may be included in the processing circuit 1. The processing circuit 1 may be implemented by a car navigation system such as an in-vehicle infotainment (IVI) system, and the vehicle control device 7 may be implemented by a travel assistance system such as an advanced driver-assistance system (ADAS).

The first path generation unit 11 generates a first traveling path (navigation drive path; NDP) at least based on high-definition map information stored in the high-definition map information storage unit 41. The first traveling path is a traveling path when performing the travel assistance control on the host vehicle. For example, the first path generation unit 11 generates the first traveling path in a lane in the high-definition map information, based on the high-definition map information stored in the high-definition map information storage unit 41 and the current position of the host vehicle. The first traveling path may be generated so as to pass through the middle in the lane in the high-definition map information.

The first path generation unit 11 may generate the first traveling path so as to lead the host vehicle to follow a presumed traveling route from a start position to a destination in the navigation map information stored in the navigation map information storage unit 42 to go straight or make a right or left turn within a section on the presumed traveling route. The first path generation unit 11 may generate the first traveling path within a predetermined section from the current position of the host vehicle to a position having a predetermined distance from the current position. The predetermined section can be set as appropriate within a range that the high-definition map information covers.

The second path generation unit 12 generates a second traveling path at least based on the surroundings of the host vehicle detected by the periphery sensor 3. The second traveling path is a possibility as a traveling path when performing the travel assistance control on the host vehicle. For example, when performing the preceding vehicle following control on the host vehicle, the second path generation unit 12 calculates a traveling trajectory of a preceding vehicle detected by the periphery sensor 3, and generates the second traveling path (car following path: CFP) using the calculated traveling trajectory of the preceding vehicle. For example, a trajectory following a middle position of the preceding vehicle in the vehicle width direction is calculated as the traveling trajectory of the preceding vehicle. The second traveling path based on the traveling trajectory of the preceding vehicle is set to have a length of about 100 meters, for example, and is successively updated as the preceding vehicle moves forward. The second path generation unit 12 may directly use the traveling trajectory of the preceding vehicle to generate the second traveling path, or may generate the second traveling path based on an offset trajectory shifted from the traveling trajectory of the preceding vehicle in the width direction of the lane. As used herein, the term "preceding vehicle" includes not only a vehicle traveling in the same lane as the host vehicle but also a vehicle traveling ahead of the host vehicle in the same direction on the same road as the host vehicle.

The second path generation unit 12 may refer to the navigation map information stored in the navigation map information storage unit 42 so as to generate the second traveling path. For example, the second path generation unit 12 sets a destination in the navigation map information in accordance with directional information provided by the occupant. The second path generation unit 12 searches for the presumed traveling route from the current position (start position) of the host vehicle to the destination in the navigation map information by Dijkstra's algorithm. The second path generation unit 12 generates the second traveling path within the lane based on the surroundings of the host vehicle such as positions of lane boundaries detected by the periphery sensor 3, for example, so as to lead the host vehicle to follow the searched presumed traveling route to go straight or make a right or left turn.

Alternatively, the second path generation unit 12 may calculate a target trajectory based on the surroundings of the host vehicle such as the positions of the lane boundaries detected by the periphery sensor 3, without referring to the navigation map information stored in the navigation map information storage unit 42, so as to generate the second traveling path using the calculated target trajectory. The second traveling path can be a traveling path of the host vehicle manually driven by the occupant. The second path generation unit 12 may generate the second traveling path within a predetermined section from the current position of the host vehicle to a position having a predetermined distance from the current position. The predetermined section can be set as appropriate within a range enabling the periphery sensor 3 to detect the surroundings necessary for the travel assistance control for the host vehicle.

The path switch determination unit 13 determines whether the host vehicle, when traveling on the first traveling path, needs to switch from the first traveling path to the second traveling path in accordance with the information on the first traveling path. The path switch determination unit 13 determines that the host vehicle needs to switch from the first traveling path to the second traveling path when detecting that the first traveling path being generated is to end later during traveling on the first traveling path. The term "later" used in the expression "the first traveling path being generated is to end later" refers to a forward point having a predetermined distance from the host vehicle, such as a position distant from the host vehicle by 300 meters, or a point in a range at which the host vehicle reaches after ten seconds. The state in which the first traveling path being generated is to end later refers to a predetermined condition in which the first traveling path is defined to have low reliability.

Figure 2:
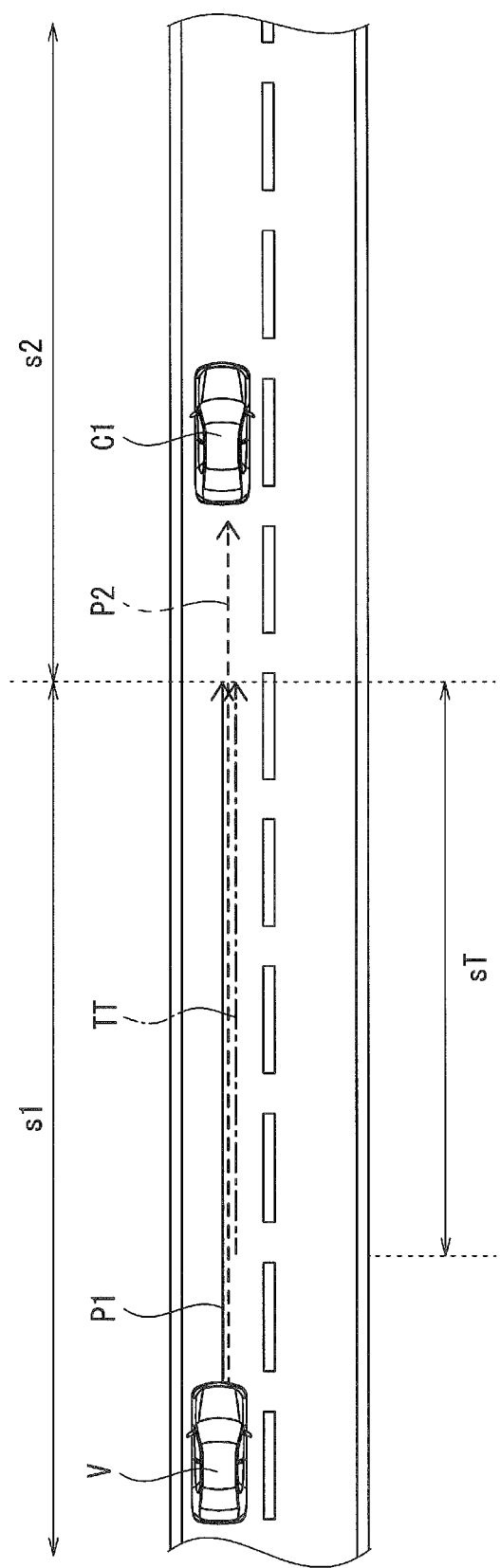
FIG. 2 is a diagram illustrating a case of switching to a traveling path which is a traveling trajectory of a preceding vehicle traveling on the same lane.

FIG. 2 illustrates a case in which the vehicle (host vehicle) V on which the travel assistance device according to the embodiment is mounted is traveling on the first traveling path P1 generated along a lane on a multi-lane road. The first path generation unit 11 generates the first traveling path P1 along the lane based on the high-definition map information around the circumference of the vehicle V. The vehicle V is located in the first section s1 covered by the corresponding high-definition map information.

When the end point of the first section s1, which corresponds to the end of the high-definition map information, is present ahead of the vehicle V, the second section s2 not having the corresponding high-definition map information is present ahead. The first path generation unit 11 cannot generate the first traveling path P1 in the second section s2 not having the corresponding high-definition map information. The vehicle V cannot keep traveling forward if the traveling path of the vehicle V would not be switched from the first traveling path to the second traveling path. The path switch determination unit 13 thus determines that the vehicle V needs to switch from the first traveling path P1 to the second traveling path P2 because of low reliability of the first traveling path P1 when there is no high-definition map information ahead of the first traveling path P1. The second traveling path P2 is a path based on the traveling trajectory of the preceding vehicle C1 traveling in the same lane as the vehicle V.

The path switch determination unit 13 also determines that the vehicle V needs to switch from the first traveling path P1 to the second traveling path P2 because of low reliability of the first traveling path P1 when the GNSS receiver 21 has poor signal reception from the navigation satellites. Poor signal reception decreases the accuracy of the positional information of the vehicle V, reading to low reliability of the first traveling path P1 that the vehicle V follows. Examples of states of poor signal reception include a state in which electric field strength of signals received by the GNSS receiver 21 is decreased, and a state in which the number of the navigation satellites from which the GNSS receiver 21 can receive signals is decreased. The GNSS receiver 21 when using a GPS receiver receives signals typically from seven to eight satellites, for example. The GNSS receiver 21 can be defined to be in a state of poor signal reception when the number of the satellites is decreased to four or five due to block of signals by objects such as tunnels or buildings.

Alternatively, the path switch determination unit 13 may estimate the reliability of the high-definition map information based on the information of vehicle-traveling histories of a road in which the first traveling path P1 is generated, and determine that the switch to the second traveling path P2 is necessary when the reliability of the high-definition map information is low. For example, when the processing circuit 1 detects a difference between the high-definition map information and the surrounding condition such as a road figure acquired by the periphery sensor 3 during traveling on the road having the first traveling path P1, the processing circuit 1 associates the difference between the actual surrounding condition and the high-definition map information with the positional information of the vehicle V, and stores the associated information as history information. The path switch determination unit 13 then determines that the reliability of the high-definition map information is low in accordance with the history information when the vehicle V travels in a section in which the difference between the actual surrounding condition and the high-definition map information is a predetermined threshold or greater. A target for the information of the traveling histories is not limited to the vehicle V, and may be any other vehicles. The information of the traveling histories is only required to be acquired by the path switch determination unit 13 via the communication device 33 from a server connected to an external network.

The transition section setting unit 14 sets a transition section sT between a point at which the vehicle V starts making the transition from the first traveling path P1 to the second traveling path P2 and a point at which the vehicle V finishes the transition, in accordance with the vehicle speed detected by the vehicle sensor 2, for example. FIG. 2 illustrates a case in which the first traveling path P1 and the second traveling path P2 pass through the straight road in the same lane. The transition section sT is preferably set such that the start point is behind the end point of the first section s1 by a front-side gazing point distance (a distance from the vehicle V to a front-side gazing point) or greater. Since the front-side gazing point distance is longer as the vehicle speed is faster, the transition section setting unit 14 calculates the front-side gazing point distance according to a preliminarily defined function using the vehicle speed as a variable, for example. The end point of the transition section sT is not necessarily set to the end point of the first section s1, and may be set to a point behind the end point of the first section s1.

The transition section sT has a minimum distance defined by the transition section setting unit 14 in view of safety between the end point of the first section s1 and the point behind the end point of the first section s1 by the front-side gazing point distance. This leads to the distance to be longer enabling the vehicle V to keep traveling on the first traveling path P1 based on the high-definition map information. For example, when the second traveling path P2 is the traveling trajectory of the preceding vehicle C1, the second traveling path P2 varies depending on the behavior of the preceding vehicle C1. Enabling the vehicle V to keep traveling on the first traveling path P1 while being generated increases a distance allowing reliable autonomous driving.

As described above, the transition section setting unit 14 sets the transition section sT in the region in which the first traveling path P1 is generated, which is within the first section s1 covered by the high-definition map information. The vehicle V thus can start and finish the transition to the second traveling path P2 during traveling in the first section s1 in which the first traveling path P1 can be generated. The vehicle V thus can make the transition to the second traveling path P2 in a state capable of detecting the relative position between the first traveling path P1 and the second traveling path P2. This can prevent irregular behavior of the vehicle V when switching from the first traveling path P1 based on the high-definition map information to the second traveling path P2, leading to a smooth switch.

Figure 3:
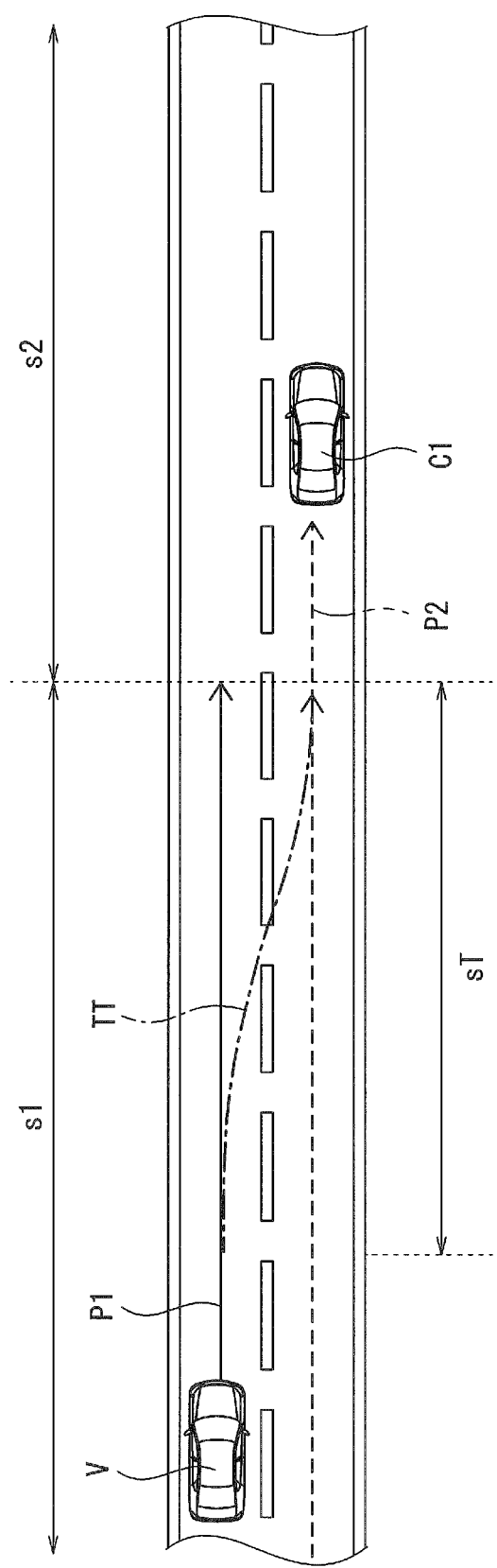
FIG. 3 is a diagram illustrating a case of switching to a traveling path which is a traveling trajectory of a preceding vehicle traveling on the adjacent lane.

For example, when the preceding vehicle C1 is traveling in another lane different from the lane of the vehicle V, as illustrated in FIG. 3, the second traveling path P2 based on the traveling trajectory of the preceding vehicle C1 deviates from the first traveling path P1, as compared with the case of FIG. 2. The transition section setting unit 14 then calculates the amount of deviation between the first traveling path P1 and the second traveling path P2, so as to regulate the transition section sT to be longer as the amount of deviation is larger. The amount of deviation is a distance between the first and second traveling paths in the road width direction, for example. The transition section sT in the case illustrated in FIG. 2 can be shorter, since the amount of deviation between the first traveling path P1 and the second traveling path P2 is smaller. This enables the vehicle V to make the transition from the first traveling path P1 to the second traveling path P2 smoothly.

The transition section setting unit 14 can also regulate the transition section sT to be longer as the curvature of the road in which the first traveling path P1 is generated is larger. The curvature of the road may be acquired by the periphery sensor 3, or may be acquired from the high-definition map information storage unit 41 or the navigation map information storage unit 42. When the road of the first traveling path P1 is straight, the length of the transition section sT can be shortened since the switch to the second traveling path P2 is relatively easy, so as to make the transition to the second traveling path P2 quickly.

Figure 4:
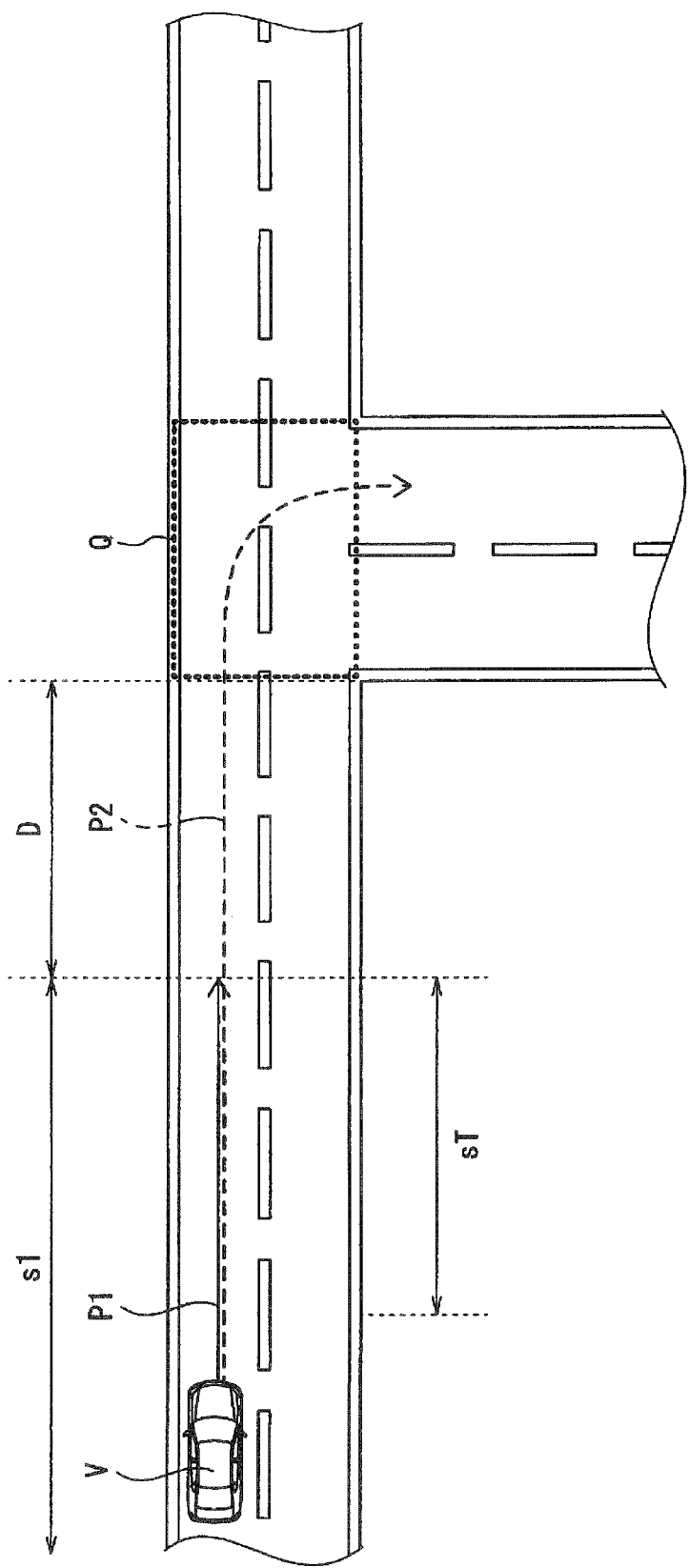
FIG. 4 is a diagram illustrating a case in which an intersection is present ahead of a traveling path based on high-definition map information.

FIG. 4 illustrates a case of a predetermined road structure detected ahead of the first traveling path P1 on which the vehicle V is traveling, such as an intersection Q at which the vehicle V is to make a right turn and it is appropriate for the vehicle to follow the second traveling path P2. The transition section setting unit 14 in this case sets the transition section sT within a range from a point behind the end point of the first section s1 by a predetermined distance to the end point of the first section s1, which is the end of the high-definition map information. The predetermined road structure can be a location requiring a right or left turn, in addition to the intersection. The transition section setting unit 14 may set the current position of the vehicle V as the start point of the transition section sT when a distance D from the end point of the first section s1 to the intersection Q is shorter than a predetermined threshold. This prevents the vehicle V from making a sudden transition while approaching the intersection Q at which the use of the second traveling path P2 is appropriate, so as to achieve a smooth and safe transition.

As illustrated in FIG. 5, for example, the path determination unit 15 estimates the reliability of each of the second traveling paths P2_1 and P2_2 generated by the second path generation unit 12, and determines the second traveling path having higher reliability as a traveling path to be switched from the first traveling path P1. For example, the path determination unit 15 estimates the reliability of the second traveling path P2_1 or P2_2 to be higher as the amount of deviation from the first traveling path P1 is smaller. FIG. 5 illustrates the case in which the reliability is determined to be higher for the second traveling path P2_1 based on the traveling trajectory of the preceding vehicle C1 traveling in the same lane as the vehicle V than for the second traveling path P2_2 based on the traveling trajectory of the preceding vehicle C2 traveling in the adjacent lane. The path determination unit 15 may estimate the reliability of the second traveling path P2_1 or P2_2 to be higher as wandering in the lateral direction is smaller. Since the preceding vehicle C2 is making a lane change during the detection by the periphery sensor 3 in the case illustrated in FIG. 5, the second traveling path P2_2 is estimated to have lower reliability than the traveling path P2_1 of the preceding vehicle C2 keeping traveling straight.

Alternatively, the path determination unit 15 may estimate that the second traveling path P2 of the preceding vehicle traveling in the same direction as the vehicle V has higher reliability. In particular, when the presumed traveling route of the vehicle V has been set, the path determination unit 15 may estimate that the second traveling path P2 has higher reliability, which is the traveling trajectory of the preceding vehicle traveling in the lane along the presumed traveling route in front of a branching road. Since a preceding vehicle traveling in a lane in a direction different from the direction of the first traveling path P1 is presumed to deviate from an available range detected by the periphery sensor 3 regardless of setting of the presumed traveling route, the second traveling path P2 following the preceding vehicle cannot be continuously generated. In view of this, the path determination unit 15 can estimate the reliability of the second traveling path P2 of the preceding vehicle traveling in the direction different from the traveling direction of the vehicle V to be lower, so as to eliminate the corresponding second traveling path P2 from the possibilities of the traveling paths to which the vehicle V can switch.

Alternatively, the path determination unit 15 may estimate the reliability of the second traveling path P2 of the preceding vehicle to be higher as the relative speed of the preceding vehicle following the second traveling path P2 with respect to the vehicle V is smaller. For example, when the relative speed of the preceding vehicle is too large or too small, the preceding vehicle is presumed to deviate from the detection range of the periphery sensor 3, and the second traveling path P2 following the traveling trajectory of the corresponding preceding vehicle thus cannot be continuously generated. The path determination unit 15 thus may estimate the reliability of the second traveling path P2 following the preceding vehicle to be lower when the speed of the preceding vehicle relative to the vehicle V is outside of a predetermined range, so as to eliminate the possibilities of the traveling paths to which the vehicle V can switch.

The trajectory generation unit 16 generates a transition trajectory TT, as illustrated in FIG. 2 and FIG. 3, which is a traveling trajectory of the vehicle V making the transition from the first traveling path P1 to the second traveling path P2 as a target traveling path determined by the path determination unit 15. The transition trajectory TT is a trajectory in which the vehicle V makes the transition from the first traveling path P1 to the second traveling path P2 between the start point and the end point of the transition section sT set and regulated by the transition section setting unit 14. The trajectory generation unit 16 generates the transition trajectory TT such that acceleration and angular velocity of the vehicle V during the transition from the first traveling path P1 to the second traveling path P2 are each set within a predetermined range.

The presentation control unit 17 controls the user I/F 5 to present guide information indicating that the vehicle V makes the transition from the first traveling path P1 to the second traveling path P2 along the transition trajectory TT generated by the trajectory generation unit 16, for example. Alternatively, the presentation control unit 17 may control the user I/F 5 to present guide information to urge the driver to travel along the transition trajectory TT.

The user I/F 5 includes an input device 51, a display 52, and a speaker 53. Examples of the input device 51 include a pointing device including a touch panel, a microphone, a keyboard, and various types of switches. The input device 51 receives, from the occupant, various kinds of information such as setting of destination of the host vehicle, instructions to switch between the autonomous driving and the manual driving, and permission to switch from the first traveling path P1 to the second traveling path P2. The display 52 may be a liquid crystal display (LCD), for example, and displays an image indicating text information or icons in accordance with the control signal from the presentation control unit 17. The speaker 53 outputs voice or a notification sound in accordance with the control signal from the presentation control unit 17.

The vehicle control device 7 outputs a control signal for controlling the actuator 6 to lead the host vehicle to follow the first traveling path P1, the transition trajectory TT, and the second traveling path P2. The vehicle control device 7 may execute the autonomous driving to autonomously drive without the occupant involved in any operation, or execute the autonomous driving to control at least one of the driving, braking, and steering operations. The vehicle control device 7 may perform acceleration/deceleration control to approximate the current speed of the host vehicle to the speed of the preceding vehicle so as to follow the preceding vehicle which is the base of the second traveling path P2 in the transition trajectory TT.

The actuator 6 controls the traveling state of the host vehicle in accordance with the control signal from the vehicle control device 7. The actuator 6 includes a drive actuator 61, a brake actuator 62, and a steering actuator 63.

The drive actuator 61 is an electronic control throttle valve, for example, and controls the accelerator of the host vehicle to regulate an opening degree in accordance with the control signal from the vehicle control device 7. The brake actuator 62 is a hydraulic circuit, for example, and controls a braking operation of the brake of the host vehicle in accordance with the control signal from the vehicle control device 7. The steering actuator 63 controls the steering of the host vehicle in accordance with the control signal from the vehicle control device 7.

(Travel Assistance Method)

A travel assistance method using the travel assistance device according to the embodiment of the present invention is illustrated below with reference to the flowchart in FIG. 6.

In step S1, the first path generation unit 11 generates the first traveling path P1, which is the current traveling path of the host vehicle, based on the high-definition map information stored in the high-definition map information storage unit 41. For example, the first path generation unit 11 extracts a road structure ahead of the host vehicle from the high-definition map information stored in the high-definition map information storage unit 41, so as to generate the first traveling path P1 within the lane based on the extracted road structure.

In step S2, the second path generation unit 12 generates the second traveling path P2, which is a possibility as a traveling path that the host vehicle follows, based on the surroundings of the host vehicle detected by the periphery sensor 3. For example, the second path generation unit 12 calculates the traveling trajectory of the preceding vehicle detected by the periphery sensor 3, and generates the second traveling path P2 based on the calculated traveling trajectory of the preceding vehicle. The traveling trajectory of the preceding vehicle is updated successively in association with the movement of the preceding vehicle so that the second traveling path P2 is generated successively. The second path generation unit 12 further generates the respective second traveling paths P2 corresponding to the number of the preceding vehicles.

In step S3, the path switch determination unit 13 determines whether the host vehicle needs to switch from the first traveling path to the second traveling path during traveling on the first traveling path. For example, the path switch determination unit 13 determines that the switch from the first traveling path to the second traveling path is needed when detecting that the first traveling path being generated is to end later because of no high-definition map information ahead of the first traveling path. The process proceeds to step S4 when the host vehicle is determined to need to switch to the second traveling path, and the process returns to step S1 when determined not to need to switch to the second traveling path.

In step S4, the transition section setting unit 14 sets the transition section sT between the point at which the vehicle V starts making the transition from the first traveling path P1 to the second traveling path P2 and the point at which the vehicle V finishes the transition. The transition section setting unit 14 generates the transition section sT enabling the vehicle V to make the transition to the second traveling path P2 smoothly, based on the speed of the vehicle V, the traveling trajectory of the preceding vehicle, the speed of the preceding vehicle, and the road figure of the first traveling path P1. The transition section sT is set for each second traveling path generated in step S2.

In step S5, when a plurality of second traveling paths P2 are generated in step S2, the path determination unit 15 estimates the reliability of the respective second traveling paths P2. When the respective traveling paths P2 are the preceding vehicle-following paths, the path determination unit 15 estimates the reliability of the respective second traveling paths P2 in accordance with the amount of deviation from the first traveling path P1, the degree of wandering in the lateral direction, or the traveling direction and the relative speed of the corresponding preceding vehicle.

In step S6, the path determination unit 15 determines the second traveling path P2 having the highest reliability evaluated in step S5 to be the traveling path to be switched from the first traveling path.

In step S7, the trajectory generation unit 16 generates the transition trajectory TT for making the transition from the first traveling path P1 to the second traveling path P2 in the transition section sT corresponding to the second traveling path P2 determined in step S6. The vehicle control device 7 controls the actuator 6 to lead the host vehicle to follow the transition trajectory TT so as to make the transition from the first traveling path P1 to the second traveling path P2.

The travel assistance device according to the present embodiment preliminarily detects that the first traveling path P1 being generated is to end, so as to control the host vehicle to follow the second traveling path P2 while the first traveling path P1 is still generated. The host vehicle, if switching to the second traveling path P2 after entering the section in which the first traveling path P1 is not generated, may cause irregular behavior because of large deviation between the respective paths. The travel assistance device according to the present embodiment can lead the host vehicle to switch from first traveling path P1 to the second traveling path P2 in a state capable of detecting the relative position between the first traveling path P1 and the second traveling path P2. The travel assistance device thus can prevent the host vehicle from causing irregular behavior when switching from the first traveling path P1 based on the high-definition map information to the other second traveling path P2, so as to smoothly make a switch between the traveling paths accordingly.

[The travel assistance device according to the present embodiment can make a determination of whether the switch of the traveling path is needed based on the map information within a predetermined distance from the host vehicle, regardless of the presence or absence of the map information at a position outside the predetermined distance. This can shorten the period during which the first traveling path is generated after switching to the second traveling path P2, which can increase the period during traveling on the first traveling path P1. The increase in the period of traveling based on the map information can enable the host vehicle to keep stable behavior during traveling.

The travel assistance device according to the present embodiment determines that the switch to the second traveling path P2 is needed under a predetermined condition in which the first traveling path P1 is defined to have low reliability. This determination can lead the host vehicle to follow the second traveling path P2 prior to the first traveling path P1 having low reliability, so as to achieve a stable travel assistance.

The travel assistance device according to the present embodiment defines that the first traveling path P1 has low reliability when there is no map information ahead of the first traveling path P1. Preliminarily detecting that the host vehicle is to travel in the second section s2 in which the high-definition map information is not present enables the host vehicle to switch to the second traveling path P2 during the generation of the first traveling path P1, so as to achieve a stable traveling assistance.

The travel assistance device according to the present embodiment determines that the first traveling path P1 has low reliability when the reception of signals transmitted from the navigation satellites is poor. This determination can lead the host vehicle to follow the second traveling path P2 prior to the first traveling path P1 with less reliance, so as to achieve a stable travel assistance.

The travel assistance device according to the present embodiment determines that the first traveling path P1 has low reliability in a section with the map information determined to have low reliability, in accordance with the information of the vehicle-traveling histories of the road having the first traveling path P1. This determination can lead the host vehicle to follow the second traveling path P2 prior to the first traveling path P1 with less reliance, so as to achieve a stable travel assistance.

The travel assistance device according to the present embodiment capable of generating the first traveling path based on the high-definition map information enables stable traveling on the first traveling path conforming to the surrounding conditions.

The travel assistance device according to the present embodiment can lead the host vehicle to start the transition to the second traveling path P2 during traveling in the first section s1 covered by the high-definition map information. Namely, the transition from the first traveling path P1 to the second traveling path P2 can be started in a state capable of detecting the position of the host vehicle in the high-definition map information. This can prevent irregular behavior of the host vehicle, so as to make a switch between the traveling paths smoothly.

The travel assistance device according to the present embodiment can lead the host vehicle to finish the transition to the second traveling path P2 during traveling in the first section s1 covered by the high-definition map information. Namely, the transition from the first traveling path P1 to the second traveling path P2 can be finished in a state capable of detecting the position of the host vehicle in the high-definition map information. This can keep the reliable autonomous driving longer, and can prevent irregular behavior of the host vehicle, so as to make a switch between the traveling paths smoothly. When the second traveling path P2 is the preceding vehicle-following path, the conformity between the end point of the transition section sT and the end point of the first section s1 increases the time used for the estimation of reliability of the first traveling path P2, so as to determine the second traveling path P2 having higher reliance as a target traveling path.

The travel assistance device according to the present embodiment can regulate the start point and the end point of the transition section sT depending on the surroundings of the host vehicle. This can ensure a distance appropriate for the transition from the first traveling path P1 to the second traveling path P2, so as to prevent irregular behavior of the host vehicle to achieve a smooth and safe transition.

The travel assistance device according to the present embodiment sets the transition section sT to be longer as the amount of deviation between the first traveling path P1 and the second traveling path P2 is larger. This can ensure a distance appropriate for the transition from the first traveling path P1 to the second traveling path P2, so as to prevent irregular behavior of the host vehicle to achieve a smooth and safe transition.

The travel assistance device according to the present embodiment sets the transition section sT to be longer as the curvature of the road in which the first traveling path P1 is generated is larger. This can ensure a distance appropriate for the transition from the first traveling path P1 to the second traveling path P2, so as to prevent irregular behavior of the host vehicle to achieve a smooth and safe transition.

The travel assistance device according to the present embodiment switches from the first traveling path P1 to the second traveling path P2 when a predetermined road structure is present ahead of the host vehicle in which the use of the second traveling path P2 is appropriate. This enables the host vehicle to follow the second traveling path P2 determined to be appropriate in the predetermined road structure such as an intersection so as to achieve stable traveling.

When the distance between the host vehicle and the predetermined road structure is less than a threshold, the host vehicle may start the transition to the second traveling path P2 from the current position. This can avoid an undesirable sudden transition in the situation in which the switch to the second traveling path P2 is needed, so as to prevent irregular behavior of the host vehicle to achieve a smooth and safe transition.

When a plurality of second traveling paths P2 are generated, the travel assistance device according to the present embodiment can determine the second traveling path having the highest reliability as a target transition path. The reliability of the respective second traveling paths P2 can be estimated in accordance with the amount of deviation from the first traveling path P1 or the degree of wandering in the lateral direction, for example. This can prevent irregular behavior of the host vehicle so as to achieve a smooth and safe transition.

When the second traveling path P2 is the preceding vehicle-following path, the host vehicle can follow the second traveling path P2 while keeping the autonomous driving without interruption at the end point of the first traveling path P1. When the plural second traveling paths P2 are generated, the reliability of the respective second traveling paths P2 can be estimated in accordance with the traveling direction and the relative speed of the respective preceding vehicles, for example. This enables the second traveling path P2 having the highest reliability to be set as a target transition path, so as to prevent irregular behavior of the host vehicle to achieve a smooth and safe transition.

Other Embodiments

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure. It should be understood that the present invention includes various embodiments not disclosed herein, such as a configuration to which the respective configurations as described in the above embodiment is optionally applied. Therefore, the technical scope of the present invention is defined only by the subject matter according to the claims reasonably derived from the foregoing descriptions.

REFERENCE SIGNS LIST

1 PROCESSING CIRCUIT
2 VEHICLE SENSOR

3 PERIPHERY SENSOR
4 STORAGE DEVICE
6 ACTUATOR
7 VEHICLE CONTROL DEVICE
11 FIRST PATH GENERATION UNIT
12 SECOND PATH GENERATION UNIT
13 PATH SWITCH DETERMINATION UNIT
14 TRANSITION SECTION SETTING UNIT
15 PATH DETERMINATION UNIT
16 TRAJECTORY GENERATION UNIT
17 PRESENTATION CONTROL UNIT
21 GLOBAL NAVIGATION SATELLITE SYSTEM (GNSS) RECEIVER
C1 PRECEDING VEHICLE
C2 PRECEDING VEHICLE
P1 FIRST TRAVELING ROUTE
P2 SECOND TRAVELING ROUTE
s1 FIRST SECTION
s2 SECOND SECTION
sT TRANSITION SECTION
TT TRANSITION TRAJECTORY
V VEHICLE (HOST VEHICLE)

The invention claimed is:

1. A travel assistance method comprising:
 detecting surroundings of a host vehicle;
 generating a first traveling path based on map information around a circumference of the host vehicle;
 generating a second traveling path based on the surroundings;
 determining that a switch from the first traveling path to the second traveling path is needed when detecting that the first traveling path being generated is to end ahead of the circumference of the host vehicle while the host vehicle is traveling on the first traveling path; and
 controlling the host vehicle to make a transition from the first traveling path to the second traveling path when the switch is determined to be needed.

2. The travel assistance method of claim 1, further comprising setting a transition section along the first and second traveling path and at a position before a point where the first traveling path being generated is to end ahead of the circumference of the host vehicle for switching from the first traveling path to the second traveling path while the host vehicle is traveling on the first traveling path.

3. The travel assistance method of claim 1, wherein the switch from the first traveling path to the second traveling path is determined to be needed when the first traveling path being generated is to end at a point ahead of the host vehicle within a predetermined distance.

4. The travel assistance method of claim 1, wherein the switch from the first traveling path to the second traveling path is determined to be needed under a predetermined condition in which the map information around the circumference of the host vehicle is defined to have low reliability.

5. The travel assistance method of claim 4, wherein the predetermined condition is a state in which the map information is not present ahead of the first traveling path.

6. The travel assistance method of claim 4, wherein the predetermined condition is a state in which a receiver for acquiring positional information of the host vehicle based on a signal received from a navigation satellite has poor reception of the signal.

7. The travel assistance method of claim 4, wherein the predetermined condition is a state in which the map information is defined to have low reliability in accordance with history information of a vehicle having traveled on a road in which the first traveling path is generated.

8. The travel assistance method of claim 1, wherein the transition is started while the host vehicle is traveling and following the first traveling path.

9. The travel assistance method of claim 1, wherein the transition is finished while the host vehicle is traveling and following the first traveling path.

10. The travel assistance method of claim 1, further comprising regulating a section from a start point to an end point of the transition in accordance with the surroundings.

11. The travel assistance method of claim 10, further comprising calculating an amount of deviation between the first traveling path and the second traveling path,
 wherein a length of the section from the start point to the end point of the transition is increased as the amount of deviation is greater.

12. The travel assistance method of claim 10, wherein a length of the section from the start point to the end point of the transition is increased as a curvature of a road of the first traveling path is greater.

13. The travel assistance method of claim 1, wherein the host vehicle is controlled to make the transition from the first traveling path to the second traveling path when a predetermined road structure is detected ahead of the host vehicle when the first traveling path is generated ahead of the host vehicle.

14. The travel assistance method of claim 13, wherein the transition is started from a current position of the host vehicle when a distance from the host vehicle to the predetermined road structure is less than a predetermined threshold.

15. The travel assistance method of claim 1, further comprising:
 generating a plurality of second traveling paths, each corresponding to the second traveling path, based on the surroundings; and
 estimating a reliability of each second traveling path,
 wherein the host vehicle is controlled to make the transition from the first traveling path to the second traveling path having higher reliability when the switch is determined to be needed.

16. The travel assistance method of claim 15, wherein the reliability of each second traveling path is estimated to be higher as an amount of deviation from the first traveling path is smaller.

17. The travel assistance method of claim 15, wherein the reliability of each second traveling path is estimated to be higher as wandering in a lateral direction is smaller.

18. The travel assistance method of claim 15, wherein:
 each second traveling path is a trajectory of a preceding vehicle ahead of the host vehicle; and
 the reliability of each second traveling path is estimated to be higher when the preceding vehicle travels in a direction identical to a traveling direction of the host vehicle.

19. The travel assistance method of claim 15, wherein:
 each second traveling path is a trajectory of a preceding vehicle ahead of the host vehicle; and
 the reliability of each second traveling path is estimated to be higher as a relative speed of the preceding vehicle with respect to the host vehicle is smaller.

20. A travel assistance device comprising:
 a sensor configured to detect surroundings of a host vehicle;
 a processor configured to generate a first traveling path based on map information around a circumference of the host vehicle, generate a second traveling path based on the surroundings, and determine that a switch from the first traveling path to the second traveling path is needed when detecting that the first traveling path being generated is to end ahead of the circumference of the host vehicle while the host vehicle is traveling on the first traveling path; and a vehicle control circuit configured to control the host vehicle to make a transition from the first traveling path to the second traveling path when the switch is determined to be needed.

21. The travel assistance method of claim 1, wherein the switch from the first traveling path to the second traveling path is determined to be needed while the first traveling path is being generated.

* * * * *